United States Patent
Wink

(10) Patent No.: US 9,109,337 B2
(45) Date of Patent: Aug. 18, 2015

(54) LANDSCAPE EDGING SYSTEM

(75) Inventor: John Wink, Tampa, FL (US)

(73) Assignee: Novel Ideas, Inc., Mishawaka, IN (US)

(*) Notice: Subject to any disclaimer, the term of this patent is extended or adjusted under 35 U.S.C. 154(b) by 0 days.

(21) Appl. No.: 12/291,315

(22) Filed: Nov. 7, 2008

(65) Prior Publication Data

US 2011/0277395 A1    Nov. 17, 2011

Related U.S. Application Data

(60) Provisional application No. 61/128,214, filed on May 20, 2008.

(51) Int. Cl.
| E02D 27/00 | (2006.01) |
| A01G 1/00 | (2006.01) |
| E02B 3/14 | (2006.01) |
| A01G 1/08 | (2006.01) |
| E01C 11/22 | (2006.01) |
| E01C 13/00 | (2006.01) |

(52) U.S. Cl.
CPC ... *E02B 3/14* (2013.01); *A01G 1/08* (2013.01); *E01C 11/222* (2013.01); *E01C 13/00* (2013.01)

(58) Field of Classification Search
CPC ......... A01G 1/08; E01C 11/221; E01C 13/00; Y10T 428/24777
USPC .................................. 52/102; 47/33
See application file for complete search history.

(56) References Cited

U.S. PATENT DOCUMENTS

| | | | |
|---|---|---|---|
| 3,087,279 A * | 4/1963 | Thompson | 47/33 |
| 4,934,093 A | 6/1990 | Yanna | |
| 4,969,289 A * | 11/1990 | Trifiletti | 47/33 |
| 4,976,063 A | 12/1990 | Young | |
| 5,092,076 A * | 3/1992 | Terreta | 47/33 |
| 5,119,587 A | 6/1992 | Waltz | |
| 5,134,817 A * | 8/1992 | Richardt | 52/102 |
| 5,377,447 A | 1/1995 | Fritch | |
| 5,452,541 A * | 9/1995 | DeMaio | 47/33 |
| 5,640,801 A | 6/1997 | Rynberk | |
| 6,085,458 A | 7/2000 | Gau | |
| 6,253,486 B1 * | 7/2001 | Prassas et al. | 47/33 |
| 6,379,078 B1 * | 4/2002 | Zwier | 404/7 |
| D463,868 S | 10/2002 | Foster | |
| D472,984 S | 4/2003 | Foster | |
| 6,625,925 B1 | 9/2003 | Foster | |
| 6,925,753 B1 | 8/2005 | Mallory | |
| D514,714 S | 2/2006 | Jones | |
| 7,536,825 B2 * | 5/2009 | Perotti | 47/33 |
| 7,596,903 B1 * | 10/2009 | Flanagan | 47/33 |
| 7,774,993 B2 * | 8/2010 | Strobl et al. | 52/102 |
| 2002/0078636 A1 * | 6/2002 | Whitson | 52/102 |
| 2002/0189162 A1 | 12/2002 | Richet et al. | |
| 2005/0034362 A1 * | 2/2005 | Anderson et al. | 47/33 |
| 2006/0236601 A1 * | 10/2006 | Barber | 47/33 |

* cited by examiner

*Primary Examiner* — Phi A

*Assistant Examiner* — Omar Hijaz

(74) *Attorney, Agent, or Firm* — Miller, Matthias & Hull LLP

(57) ABSTRACT

Provided is a landscape edging system comprising runs having a profile comprising a base, front edge and, in some embodiments, a leading edge, as well as a first specialized region, and optionally one or two additional specialized regions which can permit easy mowing up to the forward most edge of the edging, and can prevent lawn mower blade damage to the edging. In a preferred embodiment, the runs are comprised of shredded rubber.

9 Claims, 19 Drawing Sheets

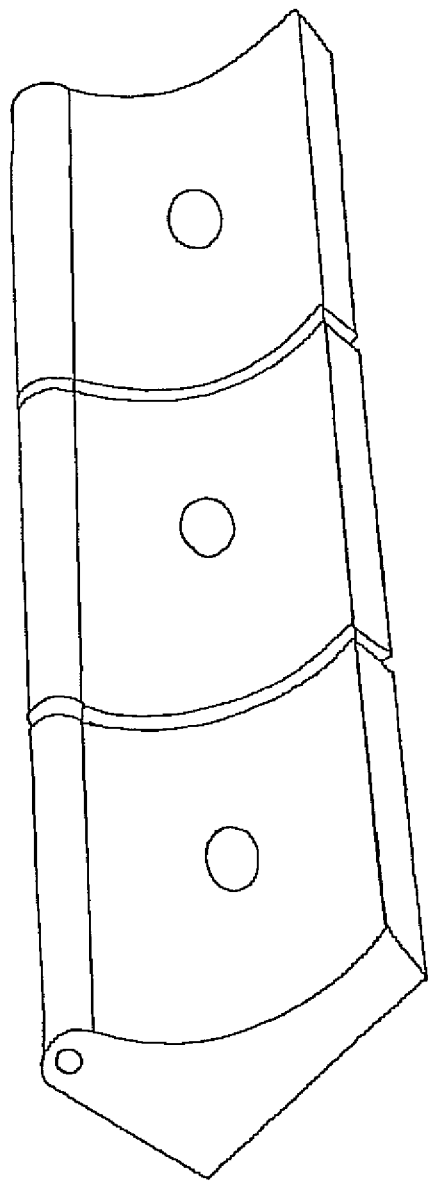
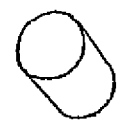
Figure 16
Figure 15

LANDSCAPE EDGING SYSTEM

This claims priority to U.S. Provisional Application No. 61/128,214, filed on May 20, 2008 and titled "Landscape Edging System".

BACKGROUND

With the advent of comprehensive do-it-yourself stores, people have become interested in aspects of homecare that have heretofore been left to professionals. Yard design and maintenance has taken center stage with an explosion of products which simplify landscape and lawn maintenance.

Among the products available at home improvement centers are lawn and bed edgings. The present state of the art in lawn and bed edgings has been simple plastic, polymer or rubber roll-up edgings which can be pressed or trench-installed around beds and at the edge of lawns. However, roll-up edging brings with it many problems. It is easily forced from the ground by freezing and thawing cycles ("heaving"). Furthermore, the sharpness of the bottom edge (for ease of insertion into the ground) also enables the edging to sink into the ground under the wheels of by landscape maintenance equipment, especially in warm/wet weather. The edging can ultimately become buried or shortened enough such that it no longer functions and is easily overgrown by grass or breached by mulch or other landscape materials. Alternatively, roll-up landscape edging which does not have the sharp edge is difficult to install, generally requiring the preparation of small trenches which must be subsequently refilled upon placement of the edging. Generally, roll-up edging also has difficulty fitting rolling ground or adapting to changes in land grade. Roll-up edging is also highly susceptible to slash damage from lawnmower blades and cracking due to the weathering effects of heat and freezing cycles. As with many plastic and rubber materials, the cracks propagate with time, and ultimately, the edging must be replaced. The use of roll-up edging also interferes with the mowing of grassy areas directly adjacent the edging; the edging stops the mower wheels, preventing the mower blades from reaching the grass abutting the edging. Attempts to ride the mower over the edging often result in mower slashes or creases in the edging and/or gradual submerging of the edging into the ground. Because of the foregoing disadvantages, it is often necessary to resort to "string" trimmers in order to adequately maintain grass directly adjacent to roll-up edging.

A second commonly used landscape edging is concrete curb edging. Such edgings are susceptible to cracks, crumbling and fissures, particularly with exposure to freezing weather or when subjected to pressure from expanding roots. Concrete curbing can cause injury and is not appropriate for all settings, particularly on playgrounds or other areas which see heavy child traffic. Concrete curbing can damage mower blades, and it has the potential to severely injure bystanders if it has crumbled or if it chips or shatters upon coming into contact with an operating mower blade.

SUMMARY OF THE INVENTION

A heavy-duty, flexible landscape edging system designed to perform as, among other things, a border or partition, particularly in landscape applications, for flower beds and landscape fixtures, is disclosed. The edging comprises pieces ("runs"), optionally interlocking, which can be fashioned in a range of lengths. In one embodiment, the runs have lengths in the range of from about 2 to about 20 feet. Among other functions, the present invention serves as a barrier against which landscaping materials, such as ground cover materials (for example, wood and bark mulches, stones or pebbles, wood chips, sand, soil, or dirt) can be retained. The system of the present invention is illustrated in the Figures.

BRIEF DESCRIPTION OF THE DRAWINGS

FIG. 15: Fixture edge front;
FIG. 16: Fixture edge plug.

BRIEF DESCRIPTION OF THE INVENTION

Figure 1:
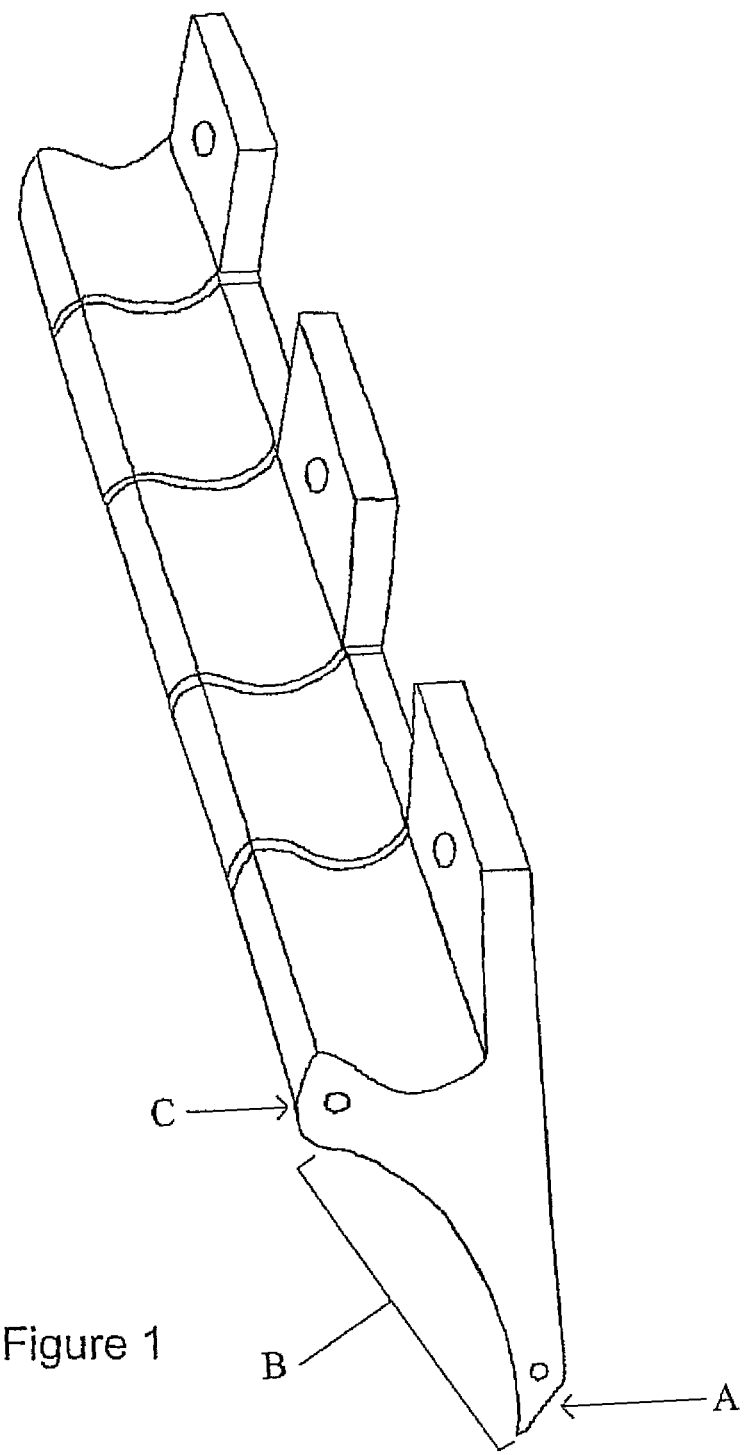
FIG. 1: Model 1 back;
A: Region 1;
B: Regions 2 and 3;
C: Region 4.
Figure 2:
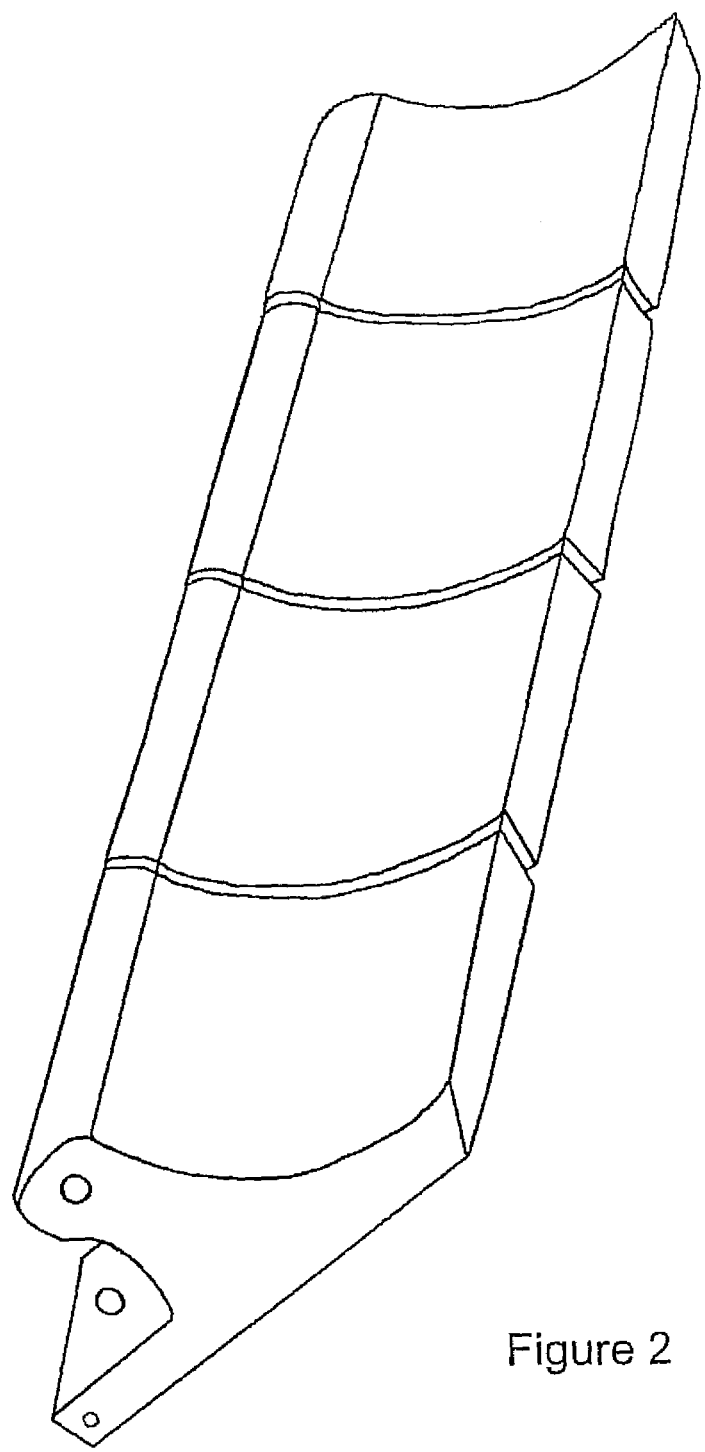
FIG. 2: Model 1 front.
Figure 3:
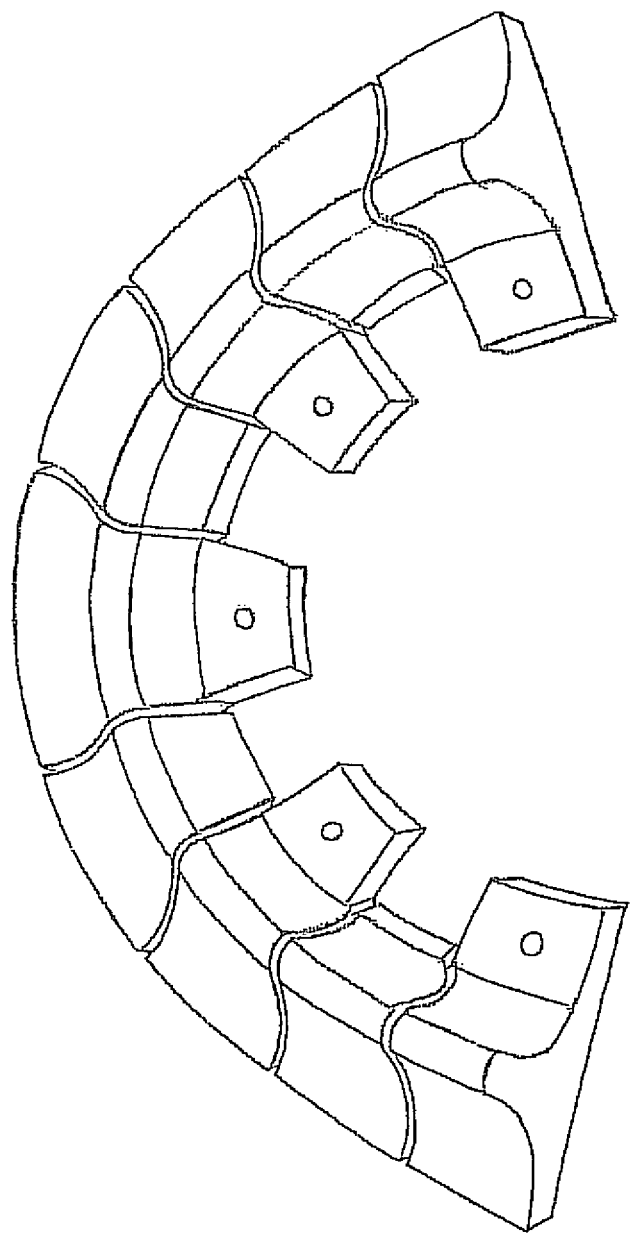
FIG. 3: Model 1 arc.
Figure 4:
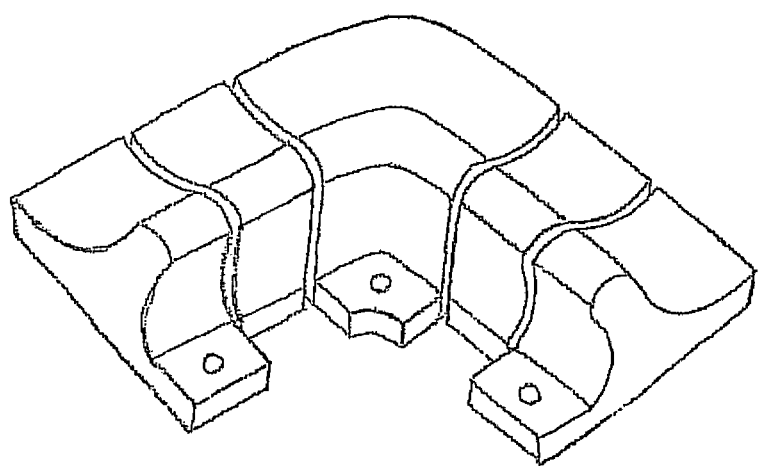
FIG. 4: Model 1 90° turn.

The edging of the present invention imparts an uncluttered appearance to the landscape and obviates many of the disadvantages of roll-up edging and concrete curbing. The edging system of the present system cannot easily be pressed into wet ground, even under the heavy weight of professional lawn maintenance equipment. It is not easily damaged by mower blades, and even upon sustaining mower damage, the appearance and functionality of the edging is generally not impaired. Furthermore, it does not damage mower blades. In some embodiments, it is prepared from recycled materials which are easily obtained and readily worked. It is affordable and generally more durable than roll up edging. It will stay firmly fastened to the ground, as it's flexible design adjusts to rolling ground/changing grades.

The present invention also has many advantages specifically with respect to concrete curb edging. It costs less, and it can be installed by a homeowner rather than a landscape professional. It can easily be removed and repositioned to accommodate the growth of trees or other plants. It is pliable such that it will not develop cracks and fissures under pressure from growing roots. In some embodiments, if necessary, it can be lifted and dramatically re-curved to a different, new configuration. It can be used in areas where children would otherwise be at risk of injury from the hard surfaces and corners of concrete edging.

It is more affordable, more flexible, and stronger than concrete curbing while remaining more stabile, more easily maintained, and easier to install than roll up edging. Some embodiments in form will have an upper lip that will help retain ground cover materials. Some embodiments will have a strategically slanted front edge that will manipulate the growth of the grass flush against the edging, improving the ability of the mower to cut grass adjacent to the edging.

Furthermore, unlike rubber roll-up and concrete curb edging, the present inventive landscape edging can be used to house and/or secure lighting and water lines, even to the extent of distributing water and light according to the desires of the homeowner. In one embodiment, the present invention can spotlight selected plants. In another embodiment, the edging can be used to water selected plants.

Moreover, the features of the edging which make the above advantages possible actually enhance the usefulness of the edging with respect to elements of landscape and garden design. For example, in many embodiments, the edging is easily manufactured such that it has the ability to create gentle curves. The design can also be extended to the creation of attractive corners and angles. Furthermore, the edging can be created such that it has a "matte" appearance, particularly when viewed from a distance and when made of recycled materials.

Moreover, it functions much more effectively in the landscape than roll up edging or concrete curbing: heavy landscape materials such as pebbles can be piled against it without causing it to buckle, and in situations in which the edging is partially or wholly unfilled, the landscape materials can actually strengthen the edging, while simultaneously functioning to keep it in place.

The system comprises one or more of the foregoing interlocking pieces ("runs"). In profile, the invention comprises a front edge preferably flush with the ground. In one embodiment, the front edge is followed by a rise (a "first region"), which relatively levels into a section (a "second region") which, in one embodiment, is a plateau essentially parallel to the ground, or at least having a significantly reduced slope with respect to the rise. The rise can be sharp or relatively gradual. Alternatively, instead of a rise followed by a relative plateau, the profile comprises a relatively shallow slope. The plateau or shallow slope can function as a platform for the wheels of lawn maintenance equipment, such as lawnmowers, allowing them to ride up onto the edging, enabling the mower to cut grass adjacent the edging margin without damaging or displacing the edging. Thus, regardless of whether the profile comprises a relative rise followed by a relative plateau or a gradual slope, the dimensions are such that mower wheels can easily ride up over the front edge, onto the plateau section or up the gradual slope. The profile of the present invention further comprises a section (a "third region") having a slope which is greater than the slope of the section preceding it, such that the third section can function as a mower stop, up against which the wheels of a mower can ride while mowing the grass adjacent the edging. Overall, the profile is dimensioned such that wheels of a lawn mower can easily ride up over the front edge and rise, yet upon contacting the mower stop section, the lawn mower blade is not impractically high, such that the grass next to the front edge cannot be mowed to a practical length.

The Invention

The landscape edging system of the present invention comprises one or more pieces, optionally interlocking at the ends, having a profile comprising a base, a front edge, optionally, a leading edge, and a first, second, third and fourth specific regions which give the edging system many of its qualities.

The base profile is the portion of the profile which is intended to contact the ground. It is generally flat, having a horizontal slope and contacting the ground along its entire length. The base profile can be wider, narrower (see FIG. 7 where the tabs along the bottom are "overhung"), or the same width as the vertical projection of the rest of the profile. The base can underlie the rest of the profile completely or only partially. In one embodiment, the base can extend beyond the vertical projection of the rest of the profile.

Figure 7:
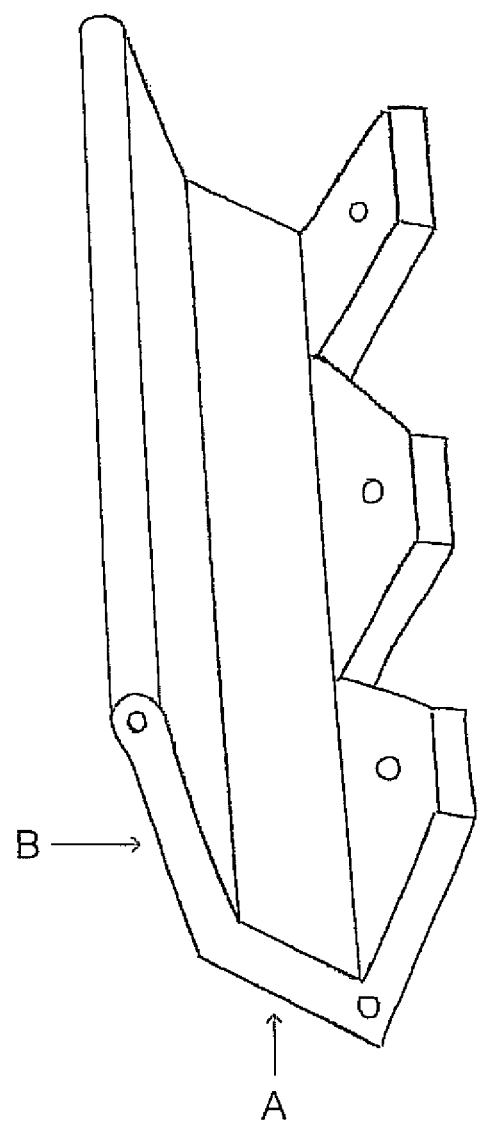
FIG. 7: Model 3 back;
A: Region 1;
B: Region 2.

The base can function as more than simply a ground contact. The base can also comprise tabs which stabilize the run and which can, additionally function to secure the run in position (FIG. 7). In one embodiment, the tabs are secured by a securing means such as a staple, tack or spike which is inserted through appropriately sized holes in the tab. The tabs can extend outwardly, away from the rest of the run (FIG. 1), but in some embodiments they can also extend inwardly such that they underlie the run profile. For example, in embodiments such as those in which the profile is unfilled, inwardly extending tabs can be used (FIG. 7).

The front edge is the part of the profile which contacts the ground, and is located at the most forward point of the base. However, the front edge is not necessarily the forwardmost part of the run profile. In some embodiments, the profile comprises a leading edge which extends farther forward than the front edge (FIG. 1), causing the front edge to appear underslung or recessed.

Figure 21:
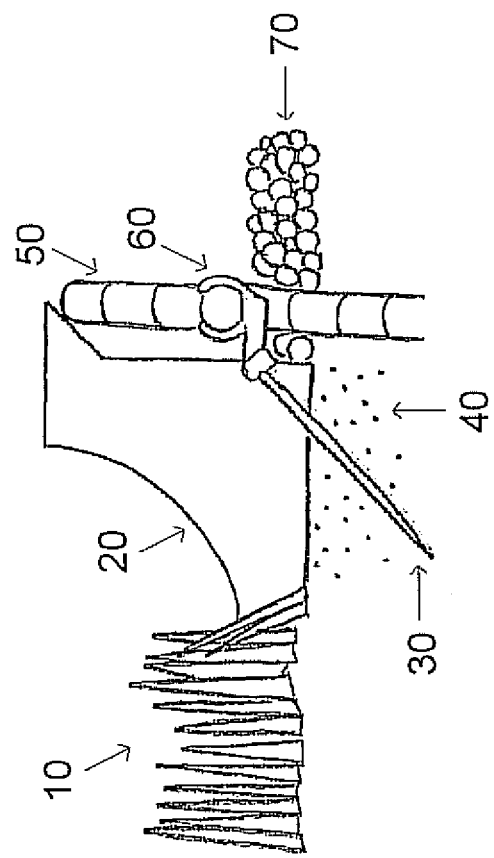
FIG. 21: Divider edge with means of attachment;
10: Lawn;
20: Edging;
30: Spike;
40: Soil;
50: Lighting or irrigation line secured by means of attachment;
60: Clip;
70: Mulch.
Figure 22:
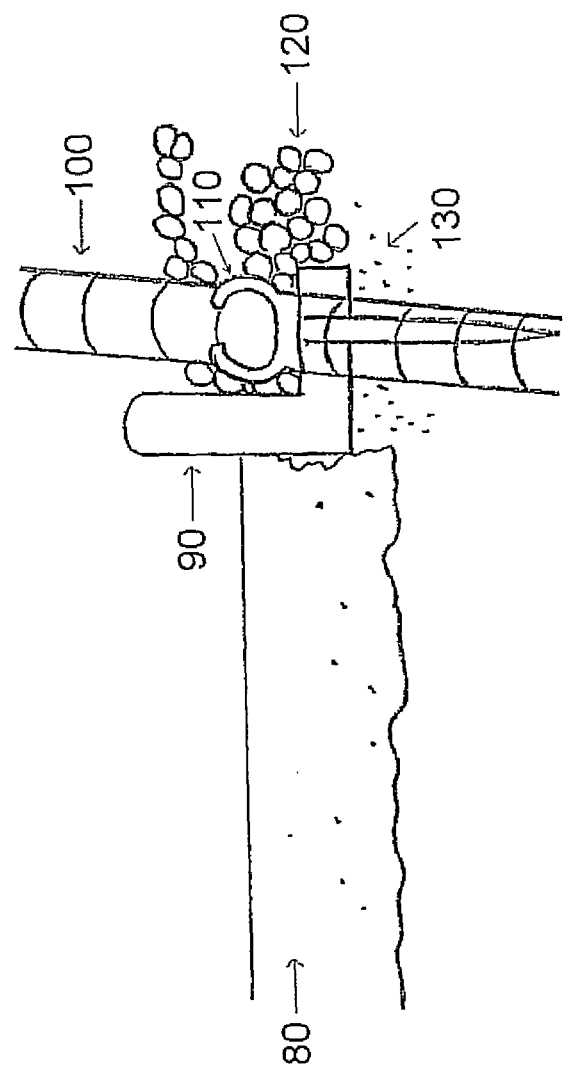
FIG. 22: Concrete edge with means of attachment;
80: Concrete walkway;
90: Edging;
100: Lighting or irrigation line secured by means of attachment;
110: Clip;
120: Mulch; and
130: Soil.

For example, in one embodiment, the run serves to edge a grassy section. One of the advantages of the present invention is that the special profile enables the wheels of lawn maintenance equipment to be lifted in order to mow adjacent the run. In one embodiment, the profile comprises a leading edge, causing the front edge to be recessed with respect to a leading edge. Such a design limits the growth of the grass near the front edge and under the leading edge. Furthermore the negative slope under the leading edge directs the growth of grass growing under the front edge away from the run (FIG. 21). As a result, the grass can be cut with a mower such that it is flush with the run, particularly when the wheels of the mower travel up onto the run. With respect to the run profile, the leading edge can be a point of abrupt change of slope, such as a point of discontinuous slope (FIG. 1). In other embodiments, the leading edge is a point of vertical slope on a smoothly varying profile.

The edging system of the present invention is characterized by a profile optionally comprising a first region comprising a rise to a height in the range of from 0 to about 2 inches and a run in the range of from about −2 to about 2 inches (a continuous range which includes vertical), wherein the slope at greater than about 90% of the region length is in the range of from about −1.0 to about 2 (a continuous range which includes vertical). In one embodiment, the region is essentially a rise from the front edge to a suitable height low enough such that the wheels of lawn maintenance equipment can easily surmount the height during mowing, allowing the mowing blade to trim up to the edging. As indicated above, the slope can be negative (due to a negative run), resulting in a "leading edge" situation; the slope can be positive, resulting in a "ramp" situation; or the slope can be vertical, resulting in a step. In the case of a step, the run is approximately zero. While the height can be as much as two inches or even more, a height in the range of from about 0.5 to about 1.5 inches is preferable.

The second region follows the first, and comprises a run in the range of from about 0.5 inches to about 10 inches, and a slope in the range of from about −0.5 to about 1.0 (a continuous range which includes horizontal). The second region is a region of relative plateau with respect to the first. In one embodiment, the second region has a slope shallow enough such that the wheels of lawn maintenance equipment are easily maintained on the second region while mowing, and do not require unreasonable effort by a lawn mower operator to maintain the wheels on the region while mowing the grass abutting the run.

In general the first region ends at the point on the profile at which the slope begins to decrease. The second region begins at a point after the first region ends, at which the slope has decreased to a value below about 1.0, and preferably below a value of about 0.5. The transition between the second and first regions can be abrupt or smooth. In some embodiments, the profile generally shows an abrupt transition from greater slope (first region) to shallower slope (second region). For example, the profile can resemble a step with a sharp vertex (FIG. 7). In another embodiment, a sharp vertex exists in a leading edge situation (FIG. 1). In still other embodiments, the transition from the first region to the second region is rounded, such that mower wheels can more easily ride up onto the second region. In general, the second region ends at a point on the profile at which the slope begins to increase, and the third region begins at a point after the second region ends, and at which the slope has increased to a value which is greater than about one, preferably greater than about 1.5 and most preferably greater than 2.0.

Figure 8:
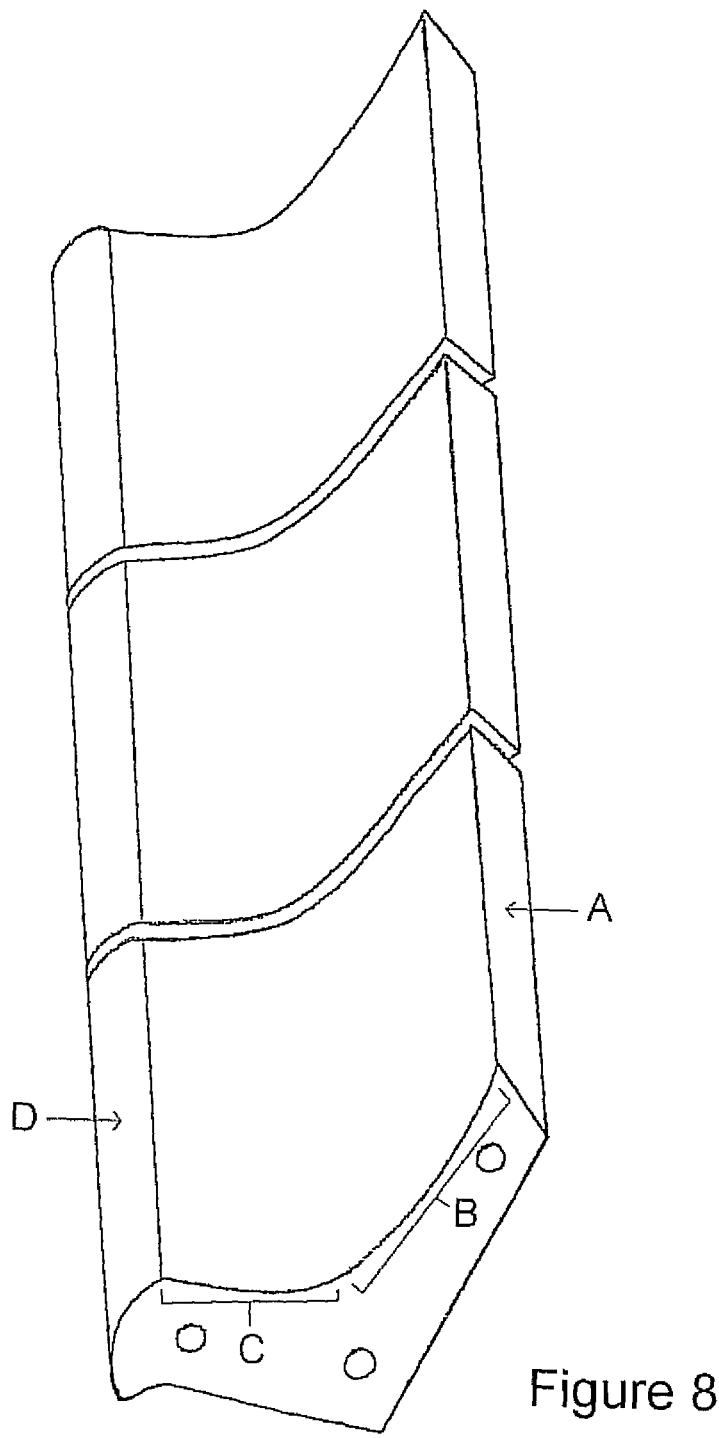
FIG. 8: Mower edge;
A: Region 1;
B: Region 2
C: Region 3;
D: Region 4.
Figure 9:
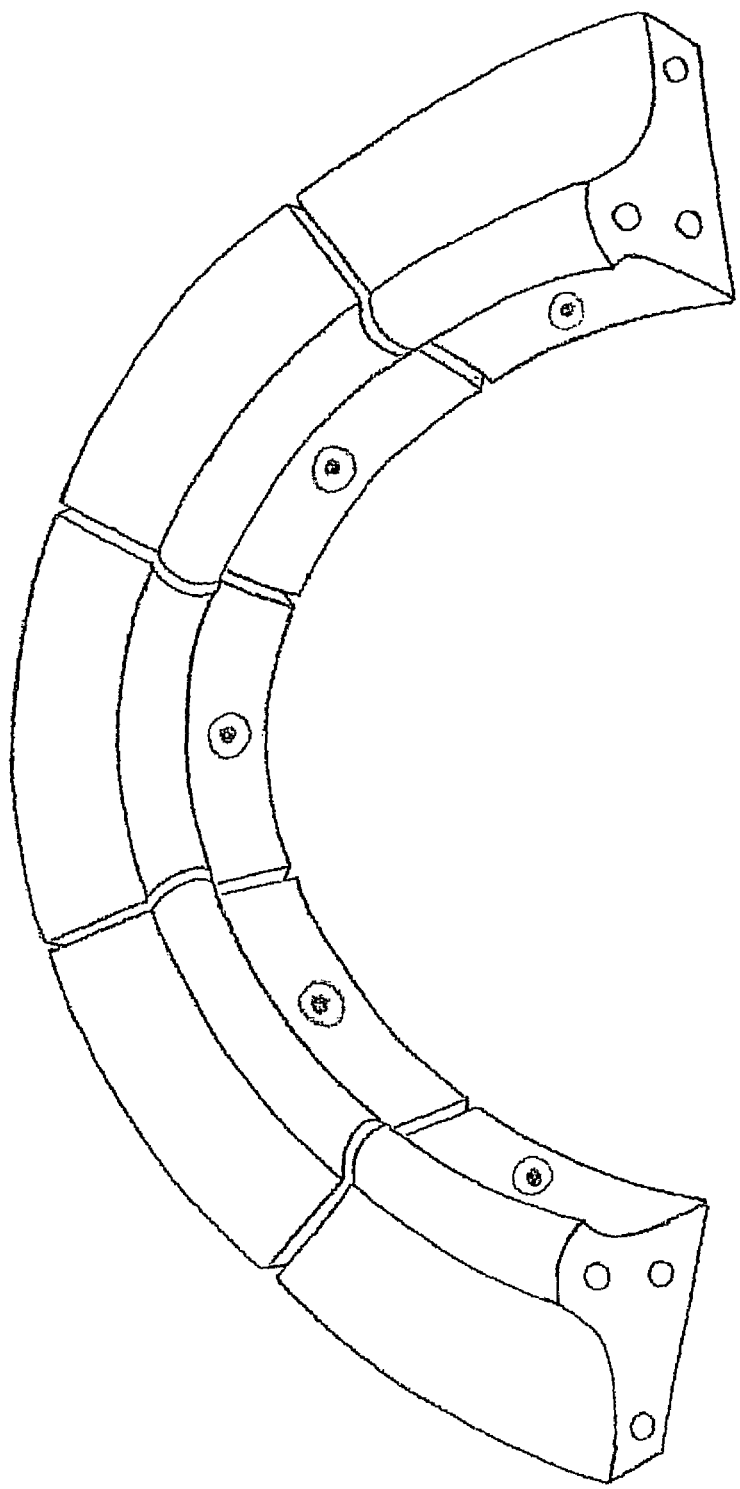
FIG. 9: Mower edge arc.
Figure 10:
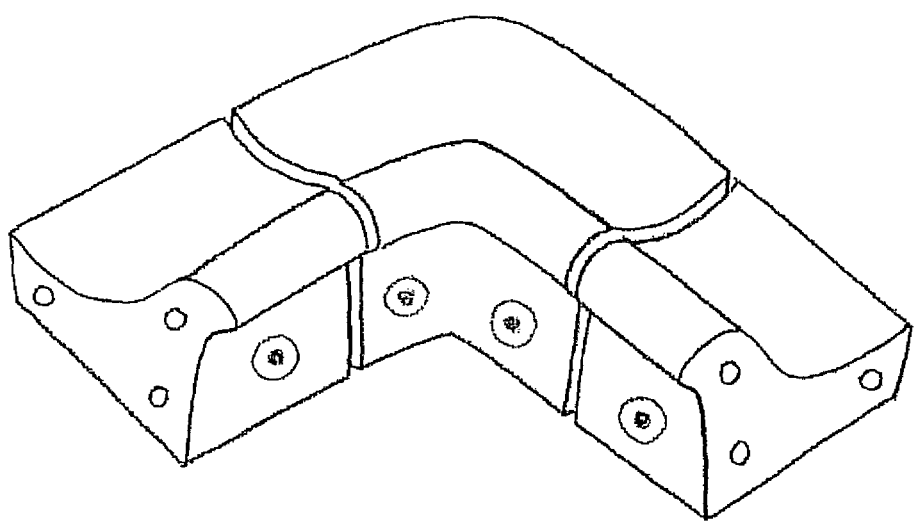
FIG. 10: Mower edge 90° turn.

The third region follows the second and comprises a total rise in the range of from about 1.0 to about 10 inches, preferably in the range of from about 1 to about 6 inches, and an average slope of greater than about 1.0, preferably greater than about 1.5. It is preferred that the third region comprise a profile such that it can act as a stop for the wheels of lawn maintenance equipment. In one embodiment, the slope is vertical such that the wheels of a lawn mower or other piece of lawn maintenance equipment are essentially prevented from easily surmounting the region. In another embodiment, the slope is increased gradually such that while a mower operator will sense mower wheels coming into contact with the region, with some extra effort, the region can be partially surmounted such that the operator can cut close to the run if need be, yet once the extra effort is ceased, the wheels easily return to the second region under the influence of gravity (see FIGS. 1-6 in which the second and third regions comprise a continuous arc, as described infra). The transition from the second region to the third region can be sharp such that the profile slope is discontinuous at a transition point, or the transition can be rounded. In one embodiment, the second and third region together comprise a continuous arc whose beginning slope (at about the beginning of the second region) is in the range of from about 0 to about 1, and whose maximum slope, at approximately the end of the third region) is in the range of from about 1 to approximately vertical. An example of an arc-shaped second/third region combination is depicted in FIGS. 1-6. In one embodiment, the transition from the second to the third regions is sharper than depicted in FIGS. 1-6, such that the end of the second region and the beginning of the third region are better defined than the embodiment depicted in FIGS. 1-6 (see FIG. 8). Although in one embodiment, the second region can have a negative slope for at least a part of its length, such a situation can give a trough which can collect debris. Thus it is preferred that the second and third regions be characterized by a continuously increasing positive slope over their combined lengths.

In many embodiments, it is desirable for the profile to comprise an additional "leveling off" region (a fourth region), such as that depicted in FIG. 1 and others. The fourth region can be functional. For example, it can form a "lip" to retard the spillage of landscape materials, especially effective at preventing light, buoyant landscape materials such as pine bark mulch from washing out of beds during floods.

Figure 12:
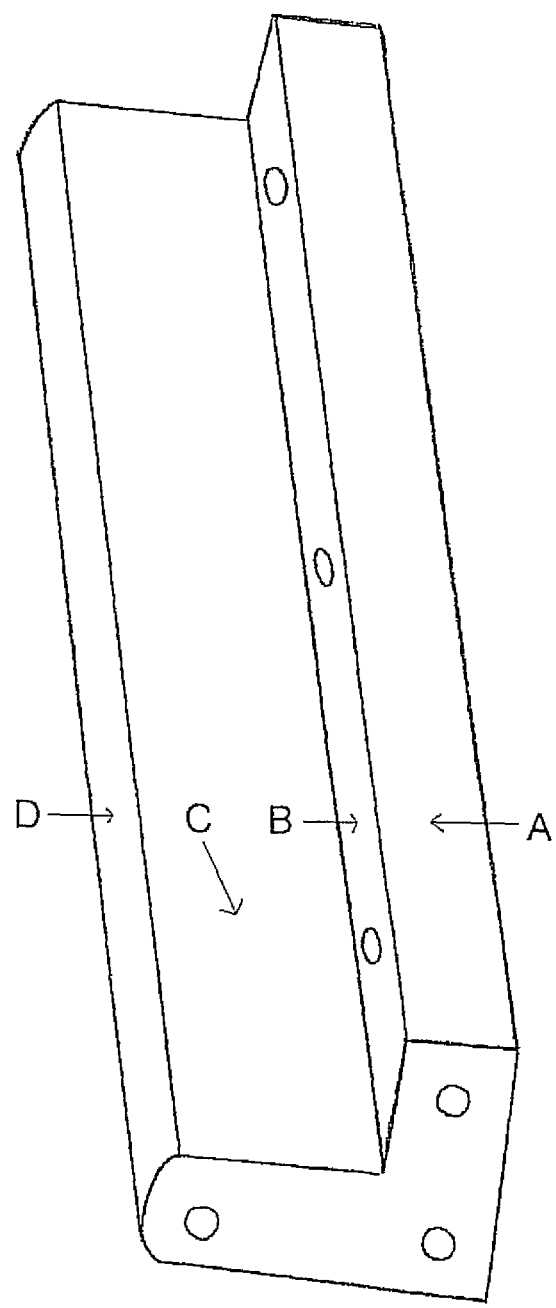
FIG. 12: Concrete edge;
A: Region 1;
B: Region 2;
C: Region 3;
D: Region 4.
Figure 13:
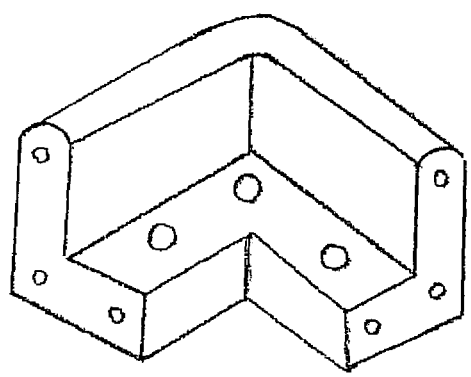
FIG. 13: Concrete edge 90° turn.

In a particularly desirable embodiment, the four regions form a step (FIG. 12). Such a configuration is particularly suited to edging concrete walkways, driveways, and the like. In another embodiment, the invention provides an edging for fixtures such as fountains (FIG. 16). The "lip" is absent. In a further embodiment, recessed securing holes are provided through which are received securing means such nails, stakes, brads or staples. In yet a further embodiment, plugs of preferably the same material as the edging are used to hide the recesses.

Figure 11:
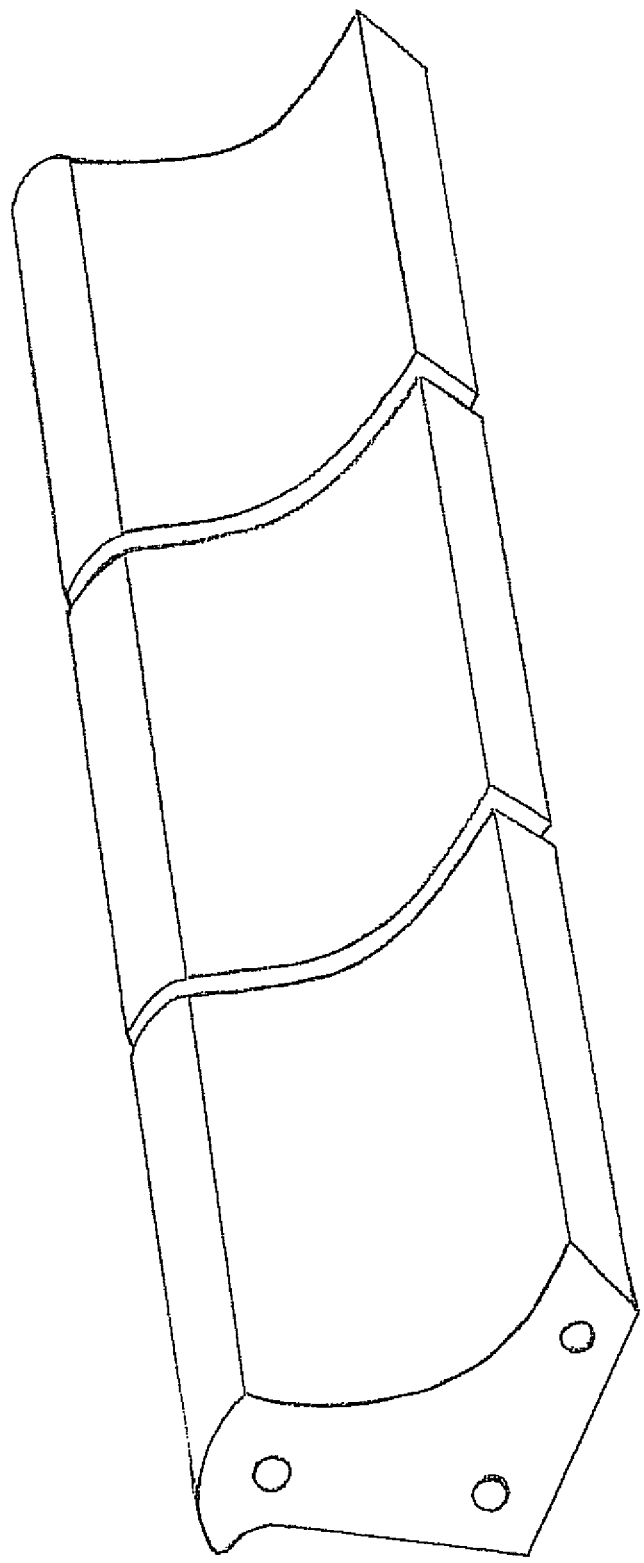
FIG. 11: Divider edge.

In yet another embodiment, an edge which divides two different landscape materials (FIG. 11), such as mulch and stones, and prevents mingling, is provided.

It should be noted that the first, second, third and fourth regions above need not have constant slope. Slopes along the profile at different points which vary within the ranges given are permissible. However, although not essential, it is desirable that the slopes at every point in the second and third region are zero or greater such that the profile does not comprise concavities which could collect clippings and other debris.

Furthermore, throughout their lengths, the runs need not have the same profile. For example, as seen in the invention embodiments comprising tabs (for example, FIGS. 1-7), the profile changes periodically along the length of the run, with the base having its broadest point at the middles of the tabs. In other embodiments, it may be desirable that the runs comprise decorative or functional notching or relief designs. For example, the design depicted in FIG. 1, as well as in most of the other figures, bears grooves which give the edging a brick-like appearance.

In different embodiments, the runs are partially or entirely "unfilled," such that the profile, or portions thereof, do not comprise underlying material. An example of such an embodiment is depicted in FIG. 7, which is entirely unfilled, as well as in FIG. 1, among others, in which the profile is partially unfilled such that the edging run has a lip, or concavity (on the same side as the tabs in the figure). In embodiments comprising such a concavity, the concavity can serve as an additional measure to keep landscape groundcover materials such as mulch and stones from spilling into other areas. Furthermore, the area can be packed with landscape materials to increase its ability to withstand the weight of mowers and other landscape equipment without buckling, as well as to keep it from being displaced. In general, a deeper concavity can be packed with a greater amount of material.

The edging system of the present invention is preferably fabricated of heavy rubber or plastic, and is preferably made from shredded-rubber-type materials. Such materials are preferred over other rubber or plastic materials in that it they are not easily damaged by the wheels and mowing blades of lawn maintenance equipment. Furthermore, upon sustaining damage such as cracks and slices, the damage is less visible than damage to other rubber materials and plastic, and the cracks and slices generally do not propagate well in the material. Also, frost and heat, which are major causes of degradation in other materials, do not easily damage shredded rubber materials. Moreover because many shredded rubber materials consist of rubber shavings compressed together in an isotropic manner, the material has a cavitated surface and volume. Without desiring to be bound by theory, it is thought that the cavities in the surface and outer volume aid the runs in remaining in place during freezing weather, minimizing the "heaving" suffered by other types of edging systems. Thus, shredded rubber is highly suitable for the edging system applications disclosed herein. However, other rubber and plastic based materials can be used.

The one or more runs of the present invention can be of nearly any length. However, utilization and manufacturing constraints indicate that the runs preferably have lengths in the range of from about 0.5 to 30 feet, and more preferably in the range of from about 2 to 10 feet. One advantage of the present inventive system is that the runs can easily be cut into shorter lengths, particularly if comprised of shredded rubber.

The edging pieces or runs can also comprise ends having interlocking means, such as tabs which interlock or partially insert, ends such that smaller runs can be combined to larger lengths as required. Furthermore, the runs are pliable and can be laid in many different configurations, including straight, curved, or circular. In an embodiment, they can be staked down for stability. In another embodiment, the present invention comprises periodic tabs as seen in, for example, FIGS. 1 and 7. Such features are particularly useful in situations in which the edging pieces are laid in curved configurations, allowing for increased bending and stability. In other embodiments, the system comprises components for sharp turns of nearly any angle, such as, for example, 90 degrees or a gradually terminating slope to finish a run. If desired, adhesive may be used to secure runs or components together where sharp curves are being created, as it may be desirable that the joints between runs or components line up in a parallel fashion.

In a commercial embodiment, the volume bounded by the regions mentioned above can be fully or partially filled in to provide stability under the wheels of heavy lawn care equipment. Furthermore, if desired, the base can be notched such that it can buckle gently under a load. The direction and magnitude of buckling can be controlled by the direction and depth of the notches.

The edging system of the present invention enables the landscaper/homeowner to completely cut a lawn with a lawnmower, without resorting to string trimmers or other edging and finishing tools. The system also functions to prevent grass, foliage, and weeds from invading flower beds or any other common areas. The runs are pliable and can be laid in nearly any configuration, including straight, curved, or circular. In an embodiment, they can be staked down for stability. In another embodiment, the present invention comprises a corrugated base which is particularly useful in situations in which the edging pieces are laid in curved configurations, allowing for increased bending and stability.

Figures 17, 18:
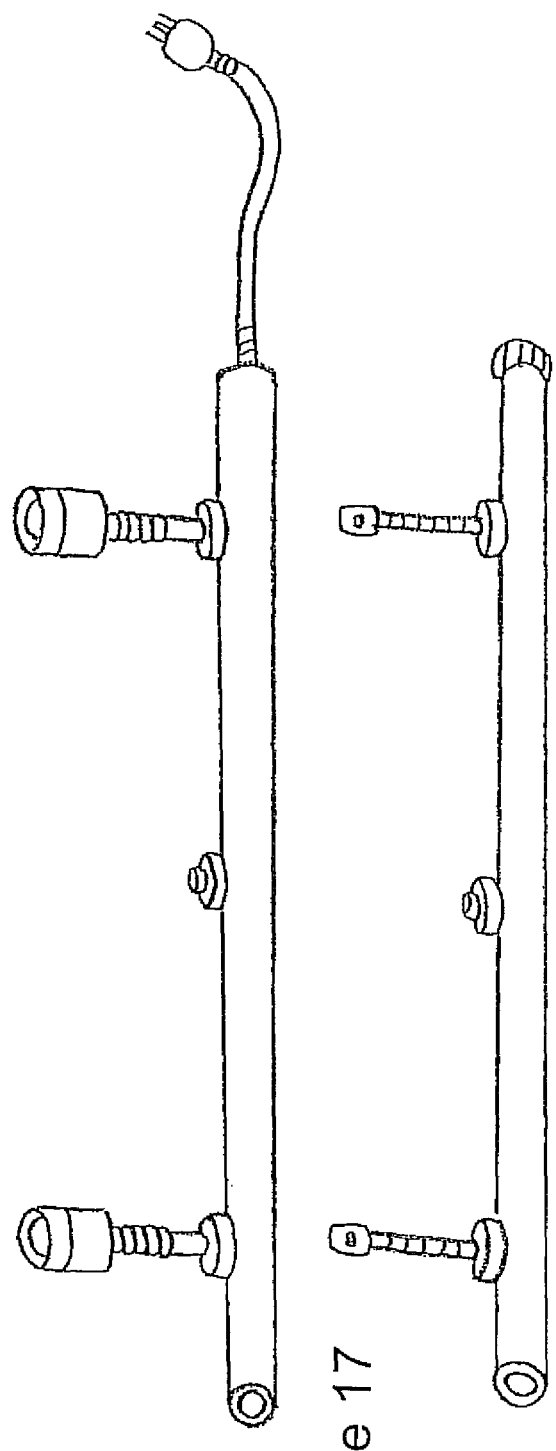
FIG. 17: Lighting line.
FIG. 18: Irrigation line.
Figure 19:
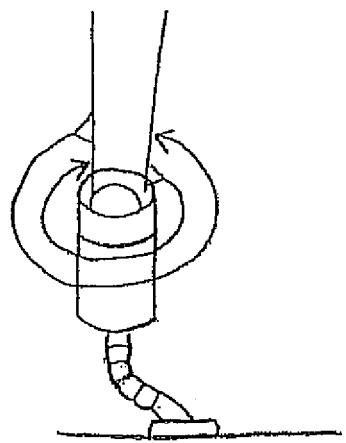
FIG. 19: Light fixture.
Figure 20:
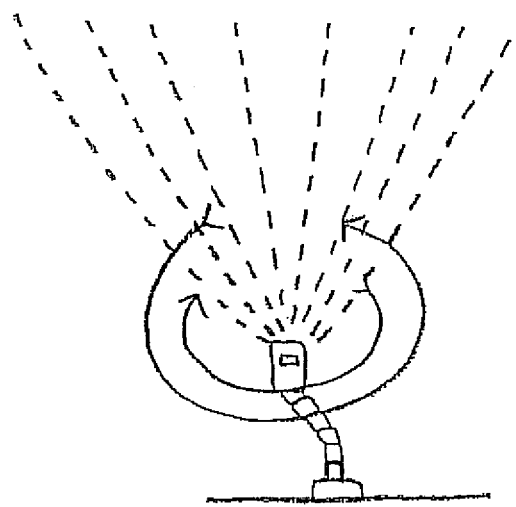
FIG. 20: Sprinkler head.

In additional embodiments, the concave back comprises a cavity which holds an irrigation line or lighting line, if desired. The irrigation can be used for watering plant material within the landscape beds (FIGS. 18 and 20). The lighting line can be used, for example, to provide spot/flood lighting on desired plants (FIGS. 17 and 19). This edging system of the present invention can be used to create aesthetically pleasing gradual curves.

Figure 14:
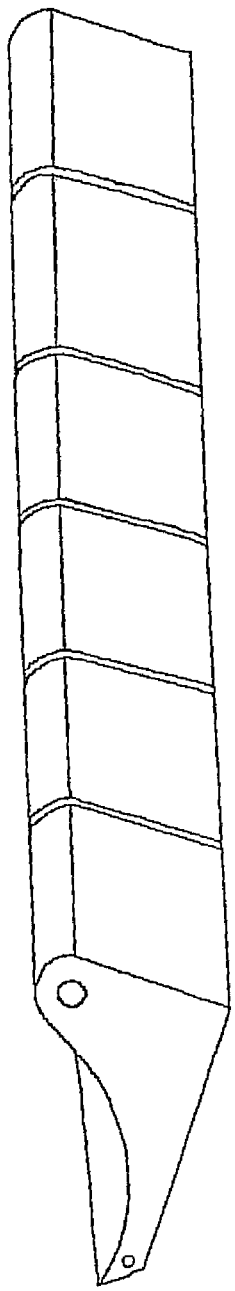
FIG. 14: Fixture edge back.

The present invention can be used with fixtures (lights, decks, fences, walls, etc.) or concrete/asphalt walks or driveways (FIG. 14). For example, in some embodiments, attached to the front edge is an extension which can be set into or mounted inside of a concrete driveway or sidewalk which abuts an area containing a fixture. The front edge is preferably approximately at the level of the driveway or sidewalk. The concave back of the edging holds landscape materials in place, and can hold back ground cover material from spilling out into walkways or patios. Each embodiment also provides components for turns and angles (FIGS. 3, 4, 9 and 10).

Additional Embodiments include 1) colors, particularly those which are easily available in recycled rubber products, including but not limited to brown, grey, black, and tan; 2) textures such as one that mimics stone; and 3) tapering components to gradually end a run or turn.

Figure 5:
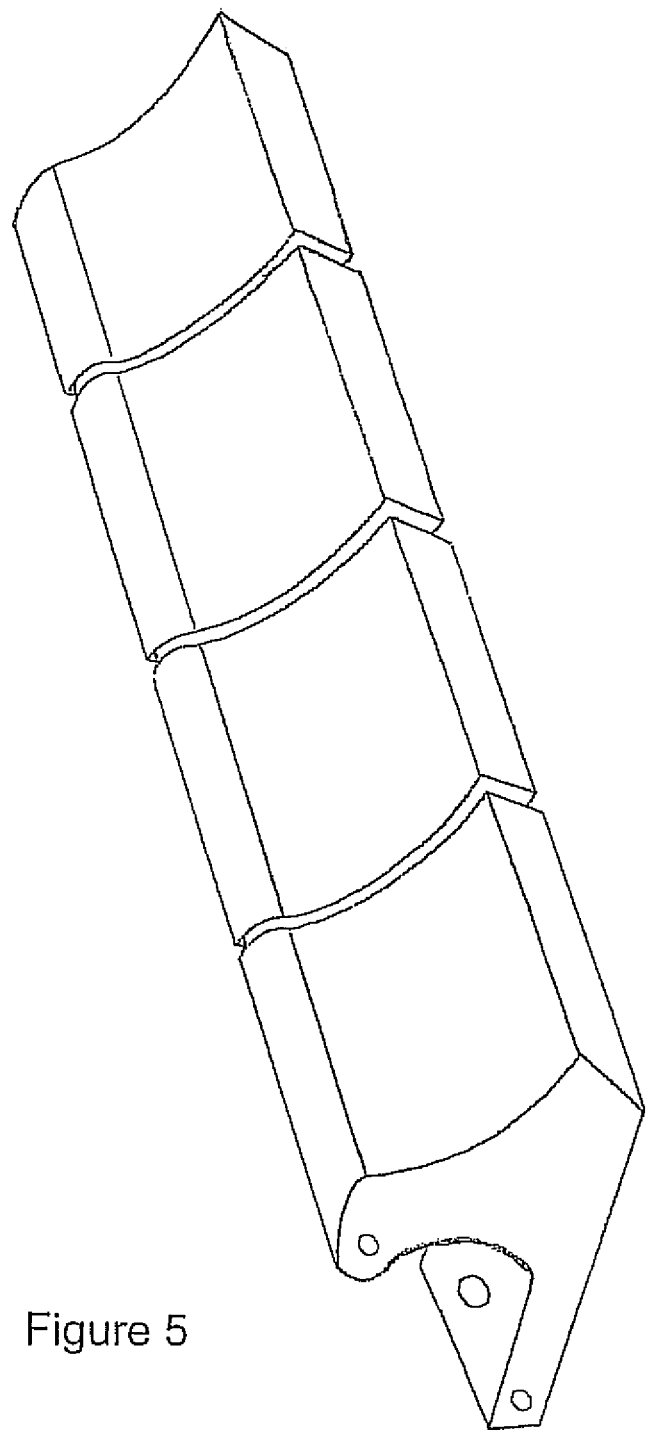
FIG. 5: Model 2 front.
Figure 6:
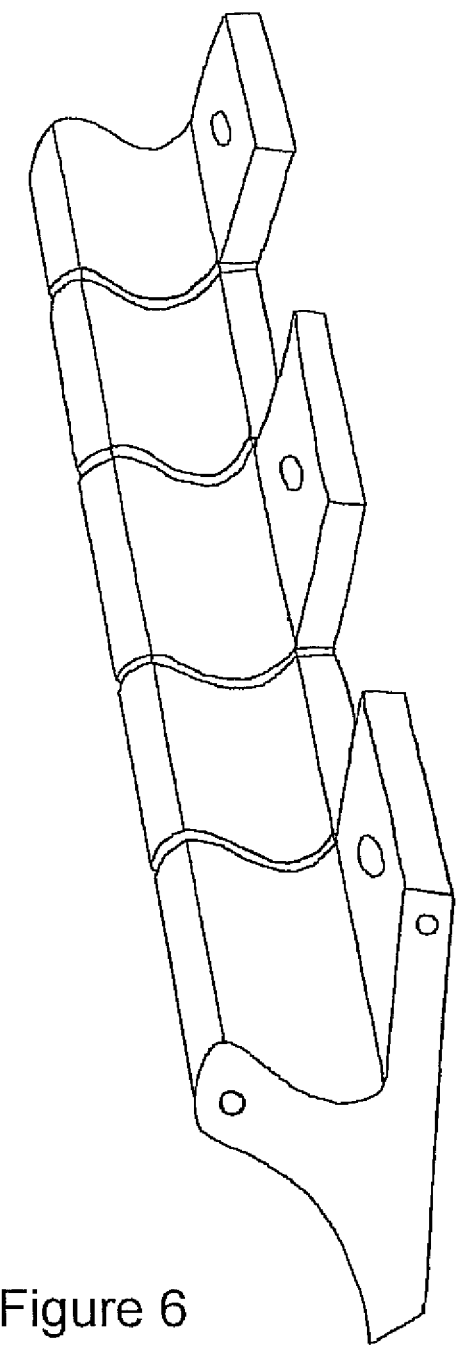
FIG. 6: Model 2 back.

In another embodiment, the invention provides an irrigation line that locks into the back of the edging (i.e., the side which abuts the planting area). It can have adjustable miniheads for watering the plant material inside the landscape beds in a stream or spray configuration. The irrigation line can include stake clips that can lock the line down to the edging system (FIG. 5). In an additional embodiment, the stakes pierce the edging on a diagonal, and the stake heads are attached to a clip which holds the lighting or watering line (FIG. 21). The heads can be on flexible stems and can include an adjustment setting that can change from stream to mist. The irrigation lines may be run in series or capped and run individually. Sockets for the heads can be spaced out periodically along the line allowing the homeowner/landscaper to place the heads where he/she may gain the most effective plant watering. In one embodiment, the edging comprises a partially or fully concave back which can provide a protective housing for the water or electrical line. In the irrigation embodiment, the irrigation line can connect to a standard hose bid and can be capped at the terminating end.

I claim:
1. A landscape edging system comprising:
at least one run comprising shredded rubber that is pliable to configure the at least one run from a first configuration into a second configuration, wherein the at least one run retains a shape of the second configuration, wherein the at least one run comprises:
a solid base having a horizontal surface for resting on a ground surface under the base, the solid base being the lowest surface of the at least one run;
a front edge located at a forward point on the base;
a first region following the front edge comprising a rise to a height in the range from 0 to about 2 inches above the base an extent in the range of from 0 to about 2 inches, and having a slope, wherein the slope is in the range of from about −1 to about 2;
a second region following the first region, having an extent in the range of from about 0.5 inches to 10 inches, and a slope in the range of from about −0.5 to about 1.0;
a third region following the second region, having a rise in the range of from about 1.0 to about 5 inches and an average slope of greater than one; and a plurality of notched channels running from the front edge and continuing through the first region, the second region, and the third region, the plurality of notched channels being depressed into each of the first region, the second region and the third region as to increase the pliability of the at least one run.

2. A landscape edging system as in claim 1, wherein the runs are secured to an area of ground or lawn by securing means.

3. A landscape edging system as in claim 1, wherein the runs comprise interlocking ends.

4. A landscape edging system as in claim 1, wherein at least two of the first, second and third regions are continuous in slope.

5. A landscape edging system as in claim 1, wherein the first configuration is a straight configuration.

6. A landscape edging system as in claim 1, wherein the second configuration includes a curved or circular shape.

7. A landscape edging system as in claim 1, wherein the plurality of notched channels are spaced apart at equal distances along the at least one run.

8. A landscape edging system for installation on ground comprising:
   at least one run comprising shredded rubber that is pliable to configure the at least one run from a first configuration into a second configuration, wherein the at least one run retains a shape of the second configuration, wherein the at least one run comprises:
   a solid horizontal base configured to rest on the ground, the horizontal base being the lowest portion of the at least one run;
   a front edge located at a forward point on the base;
   a first region following the front edge;
   a second region following the first region and located above the first region;
   a third region following the second region and located above the second region, each of the first, second, and third regions and the front edge being located at or above a level of the base; and
   a plurality of notched channels running from the front edge and continuing through the first region, the second region, and the third region, the plurality of notched channels being depressed into each of the first region, the second region and the third region as to increase the pliability of the at least one run.

9. The landscape edging system of claim 1, wherein the first region, the second region or the third region is curved.

\* \* \* \* \*